United States Patent
Rowe et al.

(10) Patent No.: US 9,781,456 B2
(45) Date of Patent: Oct. 3, 2017

(54) LOGGING INDIVIDUALS FOR TV MEASUREMENT COMPLIANCE

(71) Applicant: Google Inc., Mountain View, CA (US)

(72) Inventors: Simon Michael Rowe, Finchampstead (GB); Nicholas Salvatore Arini, Botley (GB); Owen Charlebois, Columbia, MD (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/958,643

(22) Filed: Dec. 3, 2015

(65) Prior Publication Data
US 2016/0088325 A1    Mar. 24, 2016

Related U.S. Application Data

(62) Division of application No. 13/552,561, filed on Jul. 18, 2012, now Pat. No. 9,215,022.

(51) Int. Cl.
*H04N 21/25* (2011.01)
*H04H 60/31* (2008.01)
(Continued)

(52) U.S. Cl.
CPC .......... *H04N 21/252* (2013.01); *H04H 60/31* (2013.01); *H04H 60/37* (2013.01); *H04H 60/45* (2013.01);
(Continued)

(58) Field of Classification Search
None
See application file for complete search history.

(56) References Cited

U.S. PATENT DOCUMENTS

| 7,739,705 B2* | 6/2010 | Lee .......... H04H 60/31 725/10 |
| 2004/0058675 A1 | 3/2004 | Lu et al. |

(Continued)

FOREIGN PATENT DOCUMENTS

| EP | 1 133 090 A2 | 9/2001 |
| EP | 1 213 860 B1 | 4/2008 |

OTHER PUBLICATIONS

Google Inc, International Search Report and Written Opinion, PCT/US2013/050938, Sep. 25, 2013, 14 pgs.
(Continued)

*Primary Examiner* — Omar S Parra
(74) *Attorney, Agent, or Firm* — Foley & Lardner LLP; John D. Lanza

(57) ABSTRACT

A TV audience survey system for determining the TV viewing activities of a plurality of individuals in a household includes a master device and multiple tags, each tag assigned to an individual. After an individual logs into the system and starts watching the TV, the master device communicates with the corresponding tag repeatedly to accumulate data representing the individual's TV viewing activities. Such data can be used to determine when the individual stops watching the TV for an extended period of time without logging out of the system and when the household member remains watching the TV after logging or being logged out of the system. The master device then reports the accumulated data to a remote server, which uses the data to determine whether the individual complies with the logging protocol defined by the TV audience survey system and update the TV viewership data associated with this household.

12 Claims, 9 Drawing Sheets

(51) Int. Cl.

| | | |
|---|---|---|
| *H04H 60/45* | (2008.01) | |
| *H04H 60/58* | (2008.01) | |
| *H04N 21/41* | (2011.01) | |
| *H04N 21/422* | (2011.01) | |
| *H04N 21/439* | (2011.01) | |
| *H04N 21/442* | (2011.01) | |
| *H04N 21/658* | (2011.01) | |
| *H04H 60/82* | (2008.01) | |
| *H04H 60/94* | (2008.01) | |
| *H04H 60/37* | (2008.01) | |
| *H04N 21/258* | (2011.01) | |
| *H04N 21/441* | (2011.01) | |
| *H04N 21/45* | (2011.01) | |
| *H04N 21/475* | (2011.01) | |
| *H04N 21/488* | (2011.01) | |

(52) U.S. Cl.
CPC .......... *H04H 60/58* (2013.01); *H04H 60/82* (2013.01); *H04H 60/94* (2013.01); *H04N 21/25891* (2013.01); *H04N 21/4126* (2013.01); *H04N 21/42201* (2013.01); *H04N 21/42218* (2013.01); *H04N 21/4394* (2013.01); *H04N 21/441* (2013.01); *H04N 21/44204* (2013.01); *H04N 21/44218* (2013.01); *H04N 21/4532* (2013.01); *H04N 21/4758* (2013.01); *H04N 21/4882* (2013.01); *H04N 21/6582* (2013.01)

(56) References Cited

U.S. PATENT DOCUMENTS

| | | |
|---|---|---|
| 2005/0144632 A1 | 6/2005 | Mears |
| 2007/0011040 A1 | 1/2007 | Wright et al. |
| 2007/0033607 A1 | 2/2007 | Bryan |
| 2009/0070797 A1 | 3/2009 | Ramaswamy |
| 2010/0153983 A1 | 6/2010 | Philmon et al. |
| 2011/0222528 A1* | 9/2011 | Chen .................. G01S 5/18 370/350 |
| 2012/0219156 A1* | 8/2012 | Ramaswamy ......... H04H 60/58 381/56 |

OTHER PUBLICATIONS

Notice of Allowance on U.S. Appl. No. 13/552,561 dated Aug. 17, 2015.
Office Action on U.S. Appl. No. 13/552,561 dated Mar. 25, 2015.
European Examination Report on 13740197.2 dated Mar. 10, 2016.

* cited by examiner

LOGGING INDIVIDUALS FOR TV MEASUREMENT COMPLIANCE

CROSS-REFERENCE TO RELATED PATENT APPLICATIONS

This application is a divisional of, and claims priority to, U.S. patent application Ser. No. 13/552,561, titled "LOGGING INDIVIDUALS FOR TV MEASUREMENT COMPLIANCE" and filed Jul. 18, 2012, the entirety of which is herein incorporated by reference.

TECHNICAL FIELD

The disclosed implementations relate generally to a TV viewership rating system, and in particular, to system and method for logging the viewing activities of individuals that watch a TV.

BACKGROUND

It is important to advertisers, content producers and broadcasters to be able to ascertain the scope and characteristics of TV viewership for their programs. However, the nature of TV viewership, where broadcast programs can be displayed to one or many viewers, and where viewers can come and go during a program, presents a challenge to the accurate measurement of such numbers and characteristics. TV viewership agencies have adopted a number of approaches to determine who is watching TV and what they are watching. For example, some agencies ask participants to complete logs or interact with electronic tools to document their viewing. However, even when viewers have agreed to log their viewing, or that their viewing activities can be monitored, it can still be difficult to accurately measure a program's viewership. For example, if an individual logs an entry indicating that he or she has started watching a particular TV program but then is quickly distracted to attend to something else, e.g., leaving the room to answer an hour-long phone call, the TV viewership survey agency would assume that the individual has watched the program based on the logged entry, which constitutes a false positive data sample. Similarly, another individual may spend an entire night watch many TV programs without generating a single entry indicating what he or she is watching. In this case, the TV viewership survey agency would never know which TV programs the individual watched that night due to the lack of log entries, which constitutes a false negative (i.e., missing a data sample).

SUMMARY

In accordance with some implementations described below, a method for determining the TV viewing activities of an individual using a master device adjacent a TV and a tag carried by the individual is disclosed. The method includes: detecting a plurality of audio signals from the TV; in response to detecting the plurality of audio signals, generating a plurality of TV broadcast records, each TV broadcast record including an audio fingerprint derived from the plurality of audio signals; detecting a plurality of heartbeat signals from the tag; in response to detecting the plurality of heartbeat signals, generating a TV audience record for the individual, the TV audience record including a plurality of audience status update entries, wherein the plurality of audience status update entries keep track of the individual's locations relative to the master device; and sending the plurality of TV broadcast records and the TV audience record to a remote server, wherein the remote server is configured to correlate the plurality of TV broadcast records with the TV audience record to determine one or more TV programs watched by the individual.

In accordance with some implementations described below, a TV audience survey system for determining the TV viewing activities of an individual using a master device adjacent a TV and a tag carried by the individual is disclosed, the master device having memory to store one or more programs and one or more processors for executing the one or more programs. The one or more programs include instructions for: detecting a plurality of audio signals from the TV; in response to detecting the plurality of audio signals, generating a plurality of TV broadcast records, each TV broadcast record including an audio fingerprint derived from the plurality of audio signals; detecting a plurality of heartbeat signals from the tag; in response to detecting the plurality of heartbeat signals, generating a TV audience record for the individual, the TV audience record including a plurality of audience status update entries, wherein the plurality of audience status update entries keep track of the individual's locations relative to the master device; and sending the plurality of TV broadcast records and the TV audience record to a remote server, wherein the remote server is configured to correlate the plurality of TV broadcast records with the TV audience record to determine one or more TV programs watched by the individual.

In accordance with some implementations described below, a method for determining TV viewership data of individuals in a household equipped with a TV audience survey system is disclosed. The method includes: receiving a plurality of TV audience records from the TV audience survey system, wherein a respective TV audience record includes an individual's TV viewing activities; receiving a plurality of TV broadcast records from the TV audience survey system, wherein a respective TV broadcast record includes an audio fingerprint derived from a TV program being broadcast at the household and an associated timestamp; and correlating the plurality of TV broadcast records with the plurality of TV audience records to determine TV viewership data for the individuals in the household, wherein the TV viewership data includes a plurality of TV audience measurement records, each record identifying a TV program broadcast at the household and one or more individuals that have watched the TV program.

In accordance with some implementations described below, a computer system for determining TV viewership data of individuals in a household equipped with a TV audience survey system is disclosed, the computer system having memory to store one or more programs and one or more processors for executing the one or more programs. The one or more programs include instructions for: receiving a plurality of TV audience records from the TV audience survey system, wherein a respective TV audience record includes an individual's TV viewing activities; receiving a plurality of TV broadcast records from the TV audience survey system, wherein a respective TV broadcast record includes an audio fingerprint derived from a TV program being broadcast at the household and an associated timestamp; and correlating the plurality of TV broadcast records with the plurality of TV audience records to determine TV viewership data for the individuals in the household, wherein the TV viewership data includes a plurality of TV audience measurement records, each record identifying a TV program broadcast at the household and one or more individuals that have watched the TV program.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1A:
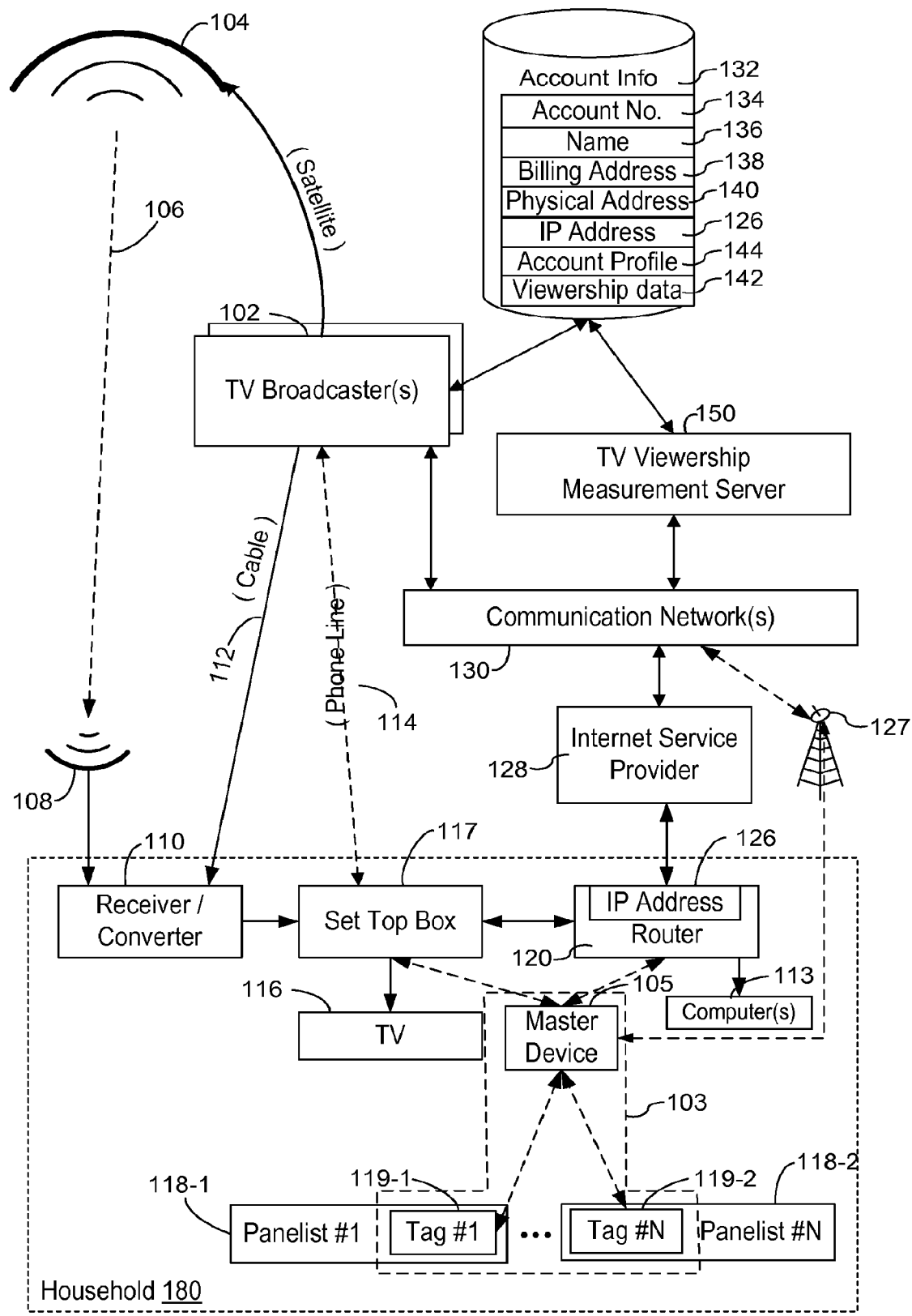
FIG. 1A is a block diagram illustrating a distributed TV content delivery and TV viewership measurement system including a plurality of communication channels for delivering TV signals to a household and TV viewership survey equipment including a TV audience survey system in the household and a TV viewership measurement server in accordance with some implementations.

FIG. 1A is a block diagram illustrating a distributed TV content delivery and TV viewership measurement system including a plurality of communication channels for delivering TV signals to a household and TV viewership measurement equipment including a TV audience survey system in the household and a TV viewership measurement server in accordance with some implementations. In some implementations, one or more TV broadcasters 102 not only provide TV programs to subscriber households but also collect account information 132 for particular subscriber households 180 that have agreed to provide TV viewing activity information for household members. This account information 132 and the TV viewing activity information collected from different households is provided to a TV viewership measurement server 150, which aggregates and analyzes the information to determine TV viewership ratings of one or more TV programs among different specific geodemographic categories (e.g., different combinations of TV viewers by age, sex and geographic region).

In some implementations, the households 180 for which the account and viewership data is retained in the database 132 are members of TV viewership panels who have agreed that their TV viewing, account and demographic information can be collected, aggregated and analyzed to allow the TV viewership measurement server 150 to determine the TV viewership data for participant households 180. In some implementations, the panelists who have agreed to have their viewing monitored are fitted with personal electronic tags that can be detected by a master device that is located near the TV. Through use of the electronic tags, the master device can determine when a particular panelist is close enough to the TV to be watching a program. Information from the tags can be used to eliminate false positives and false negatives. For example, if a panelist is not detected near the TV, then it can be inferred that he or she was probably not watching a program that was logged. Similarly, if a panelist is detected near the TV at a time when the TV was on, then it can be inferred that he or she was watching the TV programs that were tuned by the TV for as long as the viewer was in proximity to the TV. The use of panelist tags are described in greater detail below with reference to FIGS. 1A and 1B.

The account information database 132 generally includes an account number 134, a name 136, and a billing address 138 for each participant household. In some implementations, the account information 132 includes a physical address 140, such as a residence address for a household, and/or an IP address 126 associated with one or more Internet-enabled devices used by the household 180 to access the Interview and view streaming TV content and/or Internet-based services generally. In some cases, the household 180 has a fixed IP address 126, in which case the fixed IP address 126 is associated with the household's account in the database 132. In other cases, the household has a dynamically-allocated IP address, which can change on a regular basis (e.g., every time a household member "dials up," or makes a new connection to, the Internet service provider 128 (ISP)). In this case, the broadcaster 102 tracks the changes to the household's IP address 126 and updates the record of the household 180 in the database 132 accordingly. In some cases, the account information database 132 includes an account profile 144 associated with each household. The account profile 144 may include one or more demographic parameters that characterize the household members including, but not limited to, the number of household members and the age, gender, educational level, income, and profession of at least one household member. In some cases, the account information database 132 includes the TV viewership data 142 associated with each account. For instance, the TV viewership data 142 may include either the data sample collected from a household, such as the date and time indicating when the data sample was collected and information about the TV program being watched by the household members when the data sample was collected, or other data sample, such as the broadcasting duration of the TV program at the household. As shown in FIG. 1A, the database 132 may include the TV viewership data collected from multiple TV broadcasters 102. A data pre-processing procedure may be applied to the data from different sources if their formats are different from the one used by the database 132.

In some implementations, the TV viewership data 142 can include information on every TV program viewed by the household, including, for each program, a name and description of the program, the channel that played the program, the date/time of the viewing, etc. In other implementations, the TV viewership data 142 includes only programs that are viewed for at least a threshold amount of time (e.g., 1 minute or 5 minutes) as well as the start time of a program and the end time of the program. In some implementations, the TV viewing activity tracked by the TV viewership measurement server 150 includes only premium content.

As show in FIG. 1A, the TV broadcasters 102 may transmit the television programs to the household 180 over a cable 112, by transmission from a satellite 104, or by streaming over the Internet. In the case of satellite transmissions 106, the household 180 has a receiver antenna 108 to receive the signal. In the household 180 there is a receiver or converter 110 to process or decode the incoming TV signals. The decoded TV signals are transmitted to a set top box 117, which allows household members (118-1, 118-2) to control what is to be played on the television 116. In some implementations, the receiver/converter 110 is combined with the set top box 117. In general, a household member, such as member 118-1 or 118-2 controls the set top box 117 with a remote control device. In some implementations, there is additional communication between the TV broadcaster 102 and the set top box 117 over a telephone line 114. For example, the set top box 117 may provide information about what television programs are being viewed, or may receive further information for interactive television programs. The TV broadcaster 102 processes information about the household members' viewing activity from the set top box 117 and stores the processed information in the database 132.

The actual television program signals are generally transmitted by satellite 104 or over a cable 112. In some implementations, the television programs are streamed over the communications network 130, such as the Internet. In these implementations, the process of selecting a television program may be performed by a computer 113, the set top box 117, or the receiver/converter 110 that is connected directly to the household router 120 (not shown in FIG. 1A). The household router 120 is the gateway to the Internet from the household 180. Inside the household 180, the router 120 is connected to the set top box 117, and in some cases to a number of computers 113. The router 120 is connected to the communication network 130 through an Internet service provider 128. The Internet service provider 128 assigns the IP address 126 to the home router 120.

The computers 113 in the household 180 can access the Internet to perform myriad activities, such as watching TV programs streamed from the TV broadcaster 102 through the communication networks 130, the Internet service provider 128, and the household router 120, shopping, viewing videos online (e.g., on YouTube), playing online games, participating in online social networks, or engaging in many other activities. The TV program viewing activities are logged in the database 132 and tracked by the IP Address 126 of the household 180 because it is readily available and is a unique identifier (at least at a specific point in time). One of ordinary skill in the art would recognize that the data identified in the Account Information database 132 could all be found in a single database, or distributed to a different number of databases depending on the implementation.

In some implementations, the set top box 117 is able to ascertain the program being viewed by evaluating the signal received from the receiver/converter 110. In these implementations, the set top box 117 transmits the viewing activity information (e.g., program, channel, date/time, etc.) to the TV viewership measurement server 150, via the household router 120. Because the viewing activity information is transmitted through the household router 120, the IP address 126 of the household router 120 is also transmitted to the TV broadcaster 102 along with the viewing activity information. In some implementations the IP address 126 and/or viewing activity information is transmitted to the TV viewership measurement server 150 on a periodic basis (e.g., once a day). Between two transmissions, the TV viewing activity information is stored in the set top box 117. In some of these implementations, the set top box 117 is able to retrieve the IP address 126 from the router 120 and transmit it with the TV viewing activity information.

In some implementations, the TV viewership measurement server 150 is coupled to the communication networks 130 for collecting TV viewing activity information associated with different TV programs from those households that have agreed to be surveyed by the TV viewership measurement server 150 and analyzing the collected information to estimate the TV viewership ratings associated with different TV programs.

In some implementations, the TV viewership measurement server 150 needs to receive an explicit or implicit authorization from each household 180 before collecting any TV viewing activity information from the household. For example, the household 180 may provide this authorization as part of the contract it has with the TV broadcaster 102. Alternatively, the household 180 may have a separate contract with an agency that operates the TV viewership measurement server 150 in which the household 180 provides information about its household members and agrees to provide its TV viewing activity information to the agency. In either case, the household 180 is provided with certain equipment (e.g., the set top box 117 or the like), which is used for collecting the TV viewing activity information and reporting the information to the TV viewership measurement server 150. In the first case, the set top box 117 or the like may be provided by the TV broadcaster 102 with the feature of collecting the TV viewing activity information being switch on. In the second case, the set top box 117 or the like may be provided by the agency that runs the TV viewership measurement server 150 with the same feature of collecting the TV viewing activity information being switch on.

As part of the contract, the members of the household 180 agree that they will follow a protocol by first logging into the set top box 117 before they watch any program on the TV 116. In some implementations, the protocol requires that each of the household members use a remote control device to log into the set top box 117 and then identify a list of household members watching the TV. Later if a household member decides to stop watching the TV, he or she should log out from the set top box 117 to have his or her name removed from the list. Similarly, a household member that does not watch the TV initially but joins the other members to watch the TV 116 later on should first log into the set top box 117 to have his or her name added to the list. But if a household member does not log out from the set top box 117 before he or she proceeds to do something else than watching the TV, the set top box 117 would assume that this household member is still watching the TV and report this to the TV viewership measurement server 150 which constitutes a "false positive" scenario. Conversely, if a household member does not log into the set top box 117 when he or she watches the TV, the set top box 117 would not report to the TV viewership measurement server 150 that the household member is actually watching TV, which constitutes a "false negative" scenario.

In some implementations, a TV audience survey system 103 is deployed in a household 180 that has agreed to be surveyed to reduce the probability of "false positive" or "false negative" scenarios occurring to the TV viewing activity information reported from the household 180. As shown in FIG. 1A, the TV audience survey system 103 includes a master device 105 and one or more tags 119-1 and 119-2. The master device 105 is located near the TV 116 and each of the tags 119-1 or 119-2 is attached to or carried by a respective household member 118-1 or 118-2. In other words, the location of a tag roughly corresponds to the location of a household member. The master device 105 can detect audio signals from the TV 116, convert the audio signals into audio fingerprints, and report the audio fingerprints to the TV viewership measurement server 150. The master device 105 can also detect whether the tags 119-1, 119-2 are within a predefined distance (e.g., 20 feet) from the master device 105 in order to determine which household member is currently watching the TV and report the audience information to the TV viewership measurement server 150. In order to send data to the TV viewership measurement server 150, the master device 105 needs to have access to the communication network 130 (e.g., the Internet). In some implementations, the master device 105 is electrically coupled to the set top box 117 through a USB connection. In some other implementations, the master device 105 is coupled to the router 120 through a Wi-Fi connection. In yet some other implementations, the master device 105 is coupled to a wireless network through a base station 127. In each case, a data communication channel is established between the master device 105 and the TV viewership measurement server 150.

Figure 1B:
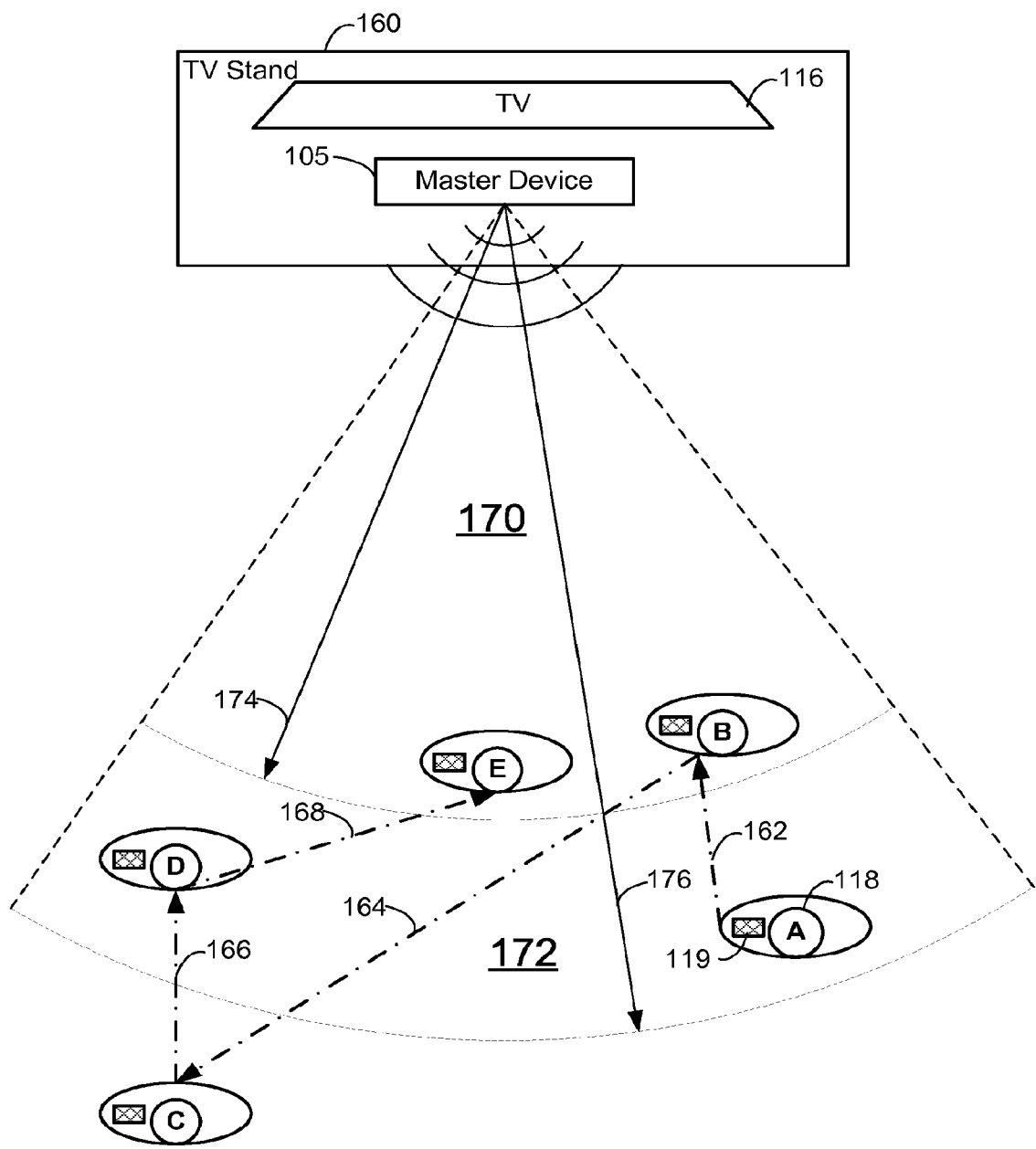
FIG. 1B is a plane view block diagram illustrating how the TV audience survey system in a household logs entries corresponding to the viewing activities of individual audiences in the household in accordance with some implementations.

FIG. 1B is a plan view block diagram illustrating how the TV audience survey system in a household logs entries corresponding to the viewing activities of individual audiences in the household in accordance with some implementation. In this example, the TV 116 is located on a TV stand 160 and there is a master device 105 located in front of the TV 116. In some implementations, the master device 105 is implemented in a smartphone that is configured to generate and transmit the TV viewing activity information to a remote TV viewership measurement server 150. A tag 119 is a portable device that is carried by a household member 118 and can communicate with the master device 105 using, e.g., the Bluetooth or RFID technology, ultra-sound signals, Wi-Fi signal or the like. In some implementations, the tag 119 has two operation modes, active and passive. In the active mode, the tag 119 transmits a signal to the master device 105 in response to a user press of an activation button on the tag 119, indicating that the household member 118 is going to watch the TV 116 and will subject itself to the survey conducted by the master device 105. The signal may trigger the master device 105 to create a new entry for the household member 118. In the passive mode, the tag 119 responds to the query signal from the master device 105, indicating its current location relative to the master device 105.

For illustrative purpose, FIG. 1B depicts two concentric and fan-shaped regions in front of the TV stand 160, which are defined by two radii 174 and 176, respectively, and the movement of the household member 118 inside and outside the two fan-shaped regions. The larger fan-shaped region defined by the radius 176 is the active mode region in which the master device 105 can detect the household member's press of the activation button on the tag 119. The smaller fan-shaped region defined by the radius 174 is the passive mode region in which the master device 105 can detect the presence of the tag 119. As shown in FIG. 1B, when the household member 118 presses the activation button at the location A, the master device 105 creates a new TV audience record for the household member 118 and sets the status of the household member 118 to "logged-in". When the household member 119 moves to the location B, the master device 105 detects its presence and updates the status of the household member 118 from "logged-in" to "active", indicating that the household member 118 is currently watching the TV.

Subsequently, when the household member 118 moves to the location C, which is outside the active operation region, the master device 105 cannot detect the presence of the tag 119. Accordingly, the master device 109 updates the status of the household member 118 to "inactive" and then to "logged-out" if the household member 118 does not return to the passive mode region defined by the radius 170 after a predefined time delay (e.g., three minutes). If the household member 118 then comes back and presses the activation button again at the location D, the master device 105 creates a new audience record for the household member 118 and sets the status of the household member 118 to be "logged-in" again. When the household member 119 moves to the location E, the master device 105 detects his or her presence and updates the status of the household member 118 from "logged-in" to "active", indicating that the household member 118 is now watching the TV. Note that, if the household member 119 appears at the location E to watch the TV without pressing the activation button, the master device 105 will notice the presence of the tag 119 because it is within the passive mode region. In this case, the master device 105 may send out an alert signal (e.g., flashes or beeps) to remind the household member 118 that it should press the activation button in order to be surveyed by the master device 105.

In other words, the TV audience survey system 103, including the master device 105 and one or more tags 119, can keep track of each household member's viewing activity information to reduce the occurrence of "false positives" or "false negatives."

Figure 2:
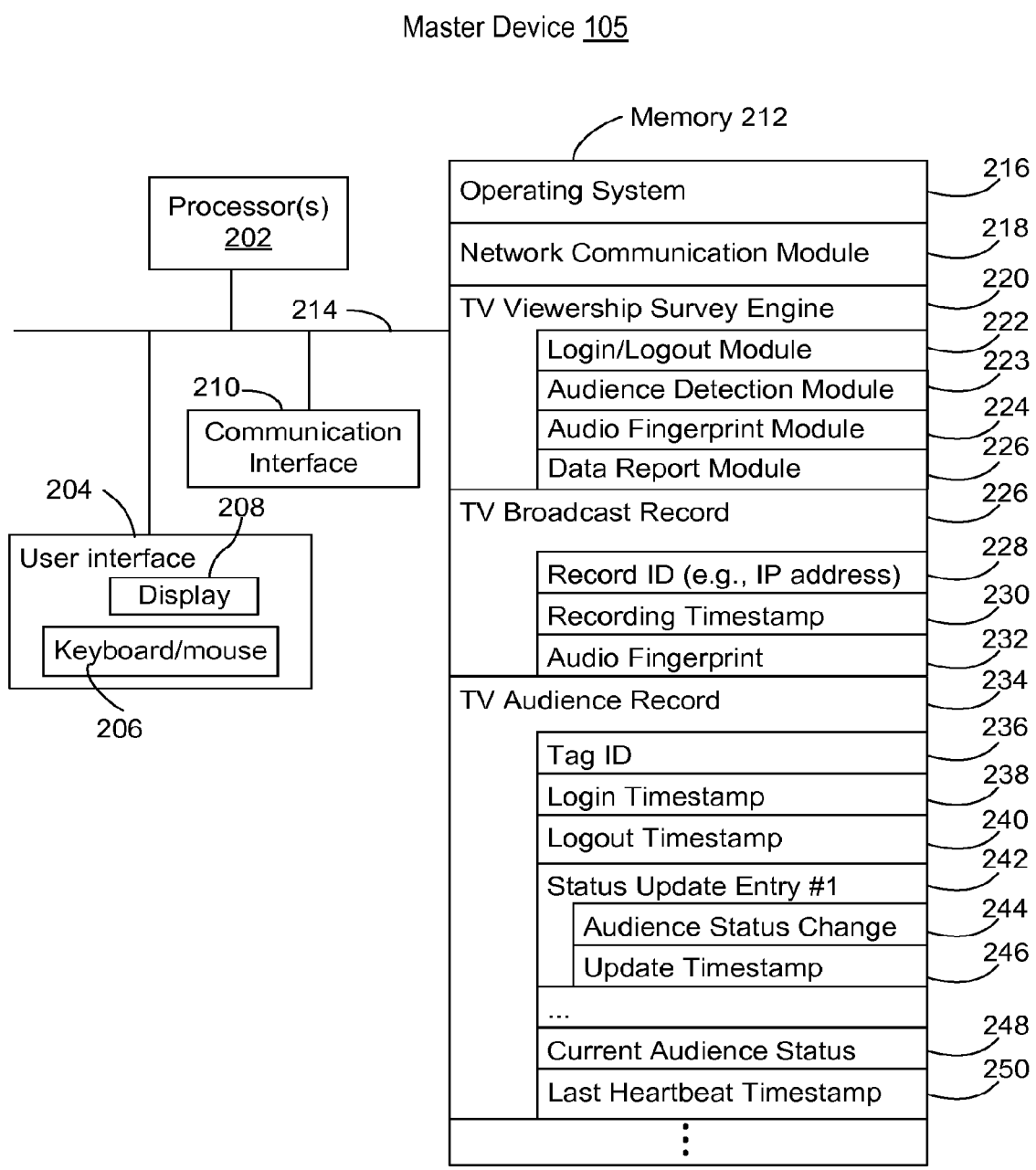
FIG. 2 is a block diagram illustrating the components of a master device 105 of the TV audience survey system 103 that are configured for logging entries corresponding to the TV viewing activities of one or more household members in accordance with some implementations.

FIG. 2 is a block diagram illustrating the components of a master device 105 of the TV audience survey system 103 that are configured for logging entries corresponding to the TV viewing activities of one or more household members in accordance with some implementations. The master device 105 includes one or more processors 202 for executing modules, programs and/or instructions stored in memory 212 and thereby performing predefined operations; one or more network or other communications interfaces 210; memory 212; and one or more communication buses 214 for interconnecting these components. In some implementations, the master device 105 includes a user interface 204 comprising a display device 208 and one or more input devices 206 (e.g., keyboard or mouse). In some implementations, the master device 105 is a mobile communication device including a smartphone or a tablet computer.

In some implementations, the memory 212 includes high-speed random access memory, such as DRAM, SRAM, DDR RAM or other random access solid state memory devices. In some implementations, memory 212 includes non-volatile memory, such as one or more magnetic disk storage devices, optical disk storage devices, flash memory devices, or other non-volatile solid state storage devices. In some implementations, memory 212 includes one or more storage devices remotely located from the processor(s) 202. Memory 212, or alternately one or more storage devices (e.g., one or more nonvolatile storage devices) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communications module 218 that is used for connecting the master device 105 to other computers via the communication network interfaces 210 and one or more communication networks (wired or wireless), such as the Internet, other wide area networks, local area networks, metropolitan area networks, etc.;
- a TV viewership survey engine 220 for generating TV broadcast records upon detecting the TV program being broadcast on the TV 116 and generating TV audience records upon determining the status of the household members;
- a plurality of TV broadcast records 226, each TV broadcast record including a record ID 228, a recording timestamp 230, and an audio fingerprint 232; and
- a plurality of TV audience records 234, each TV audience record including a tag ID 236 that corresponds to a respective household member, a login timestamp 238, a logout timestamp 240, one or more status update entries 242 including an audience status change 244 and an update timestamp 246, a current audience status 248, and a last heartbeat timestamp 250.

In some implementations, the TV viewership survey engine 220 further includes:

- an login/logout module 222 for processing instructions from respective household members to log into or out of the TV audience survey system 103, which may be issued by a tag carried by a household member or entered directly by the household member through the user interface 204 of the master device 105;
- an audience detection module 223 for determining the viewing status of a household member through communication with a tag carried by the household member and generating/updating a TV audience record 234 associated with the household member in both the active mode and passive mode;
- an audio fingerprint module 224 for converting an audio signal from the speaker of the TV 116 into an audio fingerprint that uniquely characterizes the TV program being broadcast by the TV 116 and generating a TV broadcast record 226 based on the audio fingerprint; and
- a data report module 226 for transmitting TV audience records 234 and TV broadcast records 226 to the TV viewership measurement server 150 via the Internet.

A more detailed description of the modules in the TV viewership survey engine 220 and their associated operations is provided below in connection with FIGS. 4A to 4D.

Figure 3:
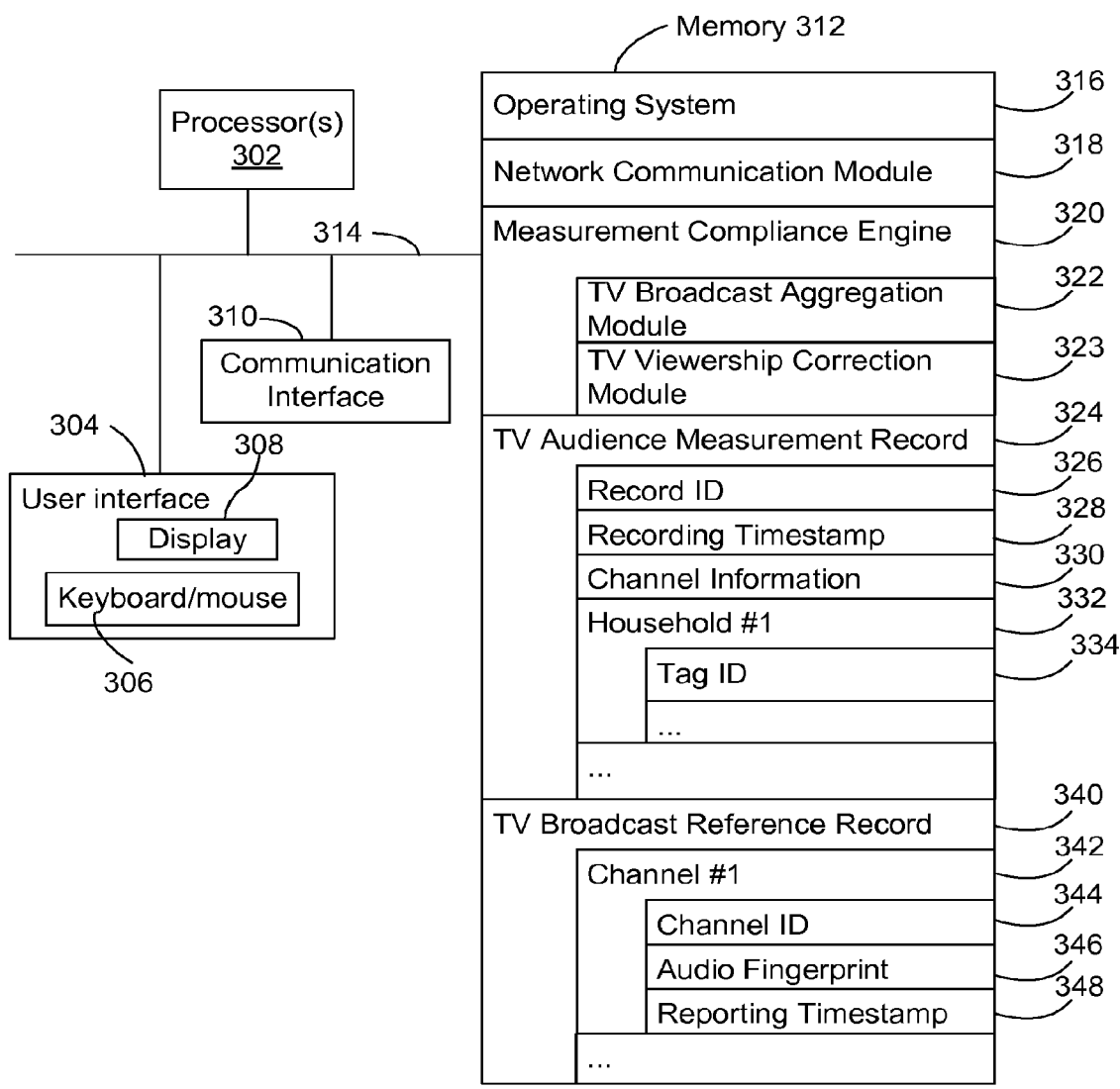
FIG. 3 is a block diagram illustrating the components of a TV viewership measurement server that are configured for determining the TV viewership data based on the log entries from different households in accordance with some implementations.

FIG. 3 is a block diagram illustrating the components of a TV viewership measurement server 150 that are configured for determining the TV viewership data based on the log entries from different households in accordance with some implementations. The measurement server 150 includes one or more processors 302 for executing modules, programs and/or instructions stored in memory 312 and thereby performing predefined operations; one or more network or other communications interfaces 310; memory 312; and one or more communication buses 314 for interconnecting these components. In some implementations, the measurement server 150 includes a user interface 304 comprising a display device 308 and one or more input devices 306 (e.g., keyboard or mouse).

In some implementations, the memory 312 includes high-speed random access memory, such as DRAM, SRAM, DDR RAM or other random access solid state memory devices. In some implementations, memory 312 includes non-volatile memory, such as one or more magnetic disk storage devices, optical disk storage devices, flash memory devices, or other non-volatile solid state storage devices. In some implementations, memory 312 includes one or more storage devices remotely located from the processor(s) 302. Memory 312, or alternately one or more storage devices (e.g., one or more nonvolatile storage devices) within memory 312, includes a non-transitory computer readable storage medium. In some implementations, memory 312 or the computer readable storage medium of memory 312 stores the following programs, modules and data structures, or a subset thereof:

- an operating system 316 that includes procedures for handling various basic system services and for performing hardware dependent tasks;
- a network communications module 318 that is used for connecting the measurement server 150 to other computers via the communication network interfaces 310 and one or more communication networks (wired or wireless), such as the Internet, other wide area networks, local area networks, metropolitan area networks, etc.;
- a measurement compliance engine 320 for determining TV programs being played at different households and the TV viewership data associated with this programs and correcting the TV viewership data by identifying the "false positive" scenarios in the data and "false negative" scenario missing from the data;
- a plurality of TV audience measurement records 324, each TV broadcast record including a record ID 326, a recording timestamp 328, channel information 330, and a plurality of households 332 that have watched the channel and tag IDs 334 associated with the household; and
- a plurality of TV broadcast reference records 340, each TV broadcast reference record including information of a channel 342, e.g., a channel ID 344, an audio fingerprint 346, and a reporting timestamp 348.

In some implementations, the measurement compliance engine 320 further includes:

- a TV broadcast aggregation module 322 for processing the TV broadcast records 226 from a respective household and determining when a TV program was broadcast on a TV 116 in the household and TV program-related information; and
- a TV viewership correction module 323 for processing the TV audience records from a respective household to identify "false positive" or "false negative" scenarios in the household's TV viewing activities and updating the TV viewership data collected from the household based on the "false positive" or "false negative" scenarios.

Figure 4A:
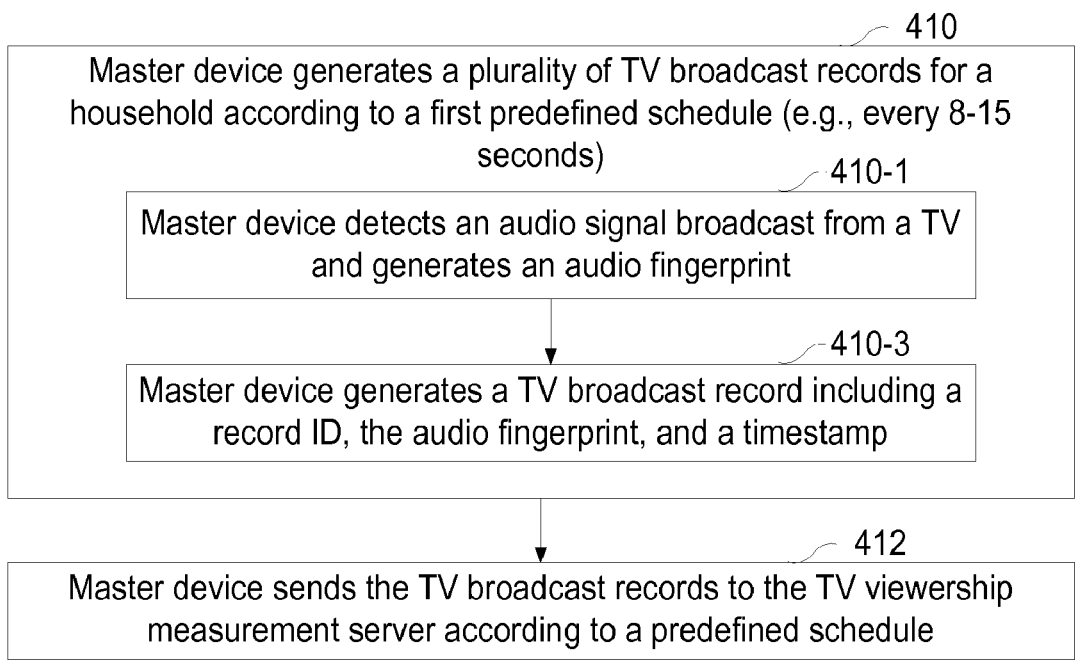
FIGS. 4A and 4B are flow charts illustrating how the TV audience survey system generates TV broadcast records and TV audience records for a household in accordance with some implementations.
Figure 4B:
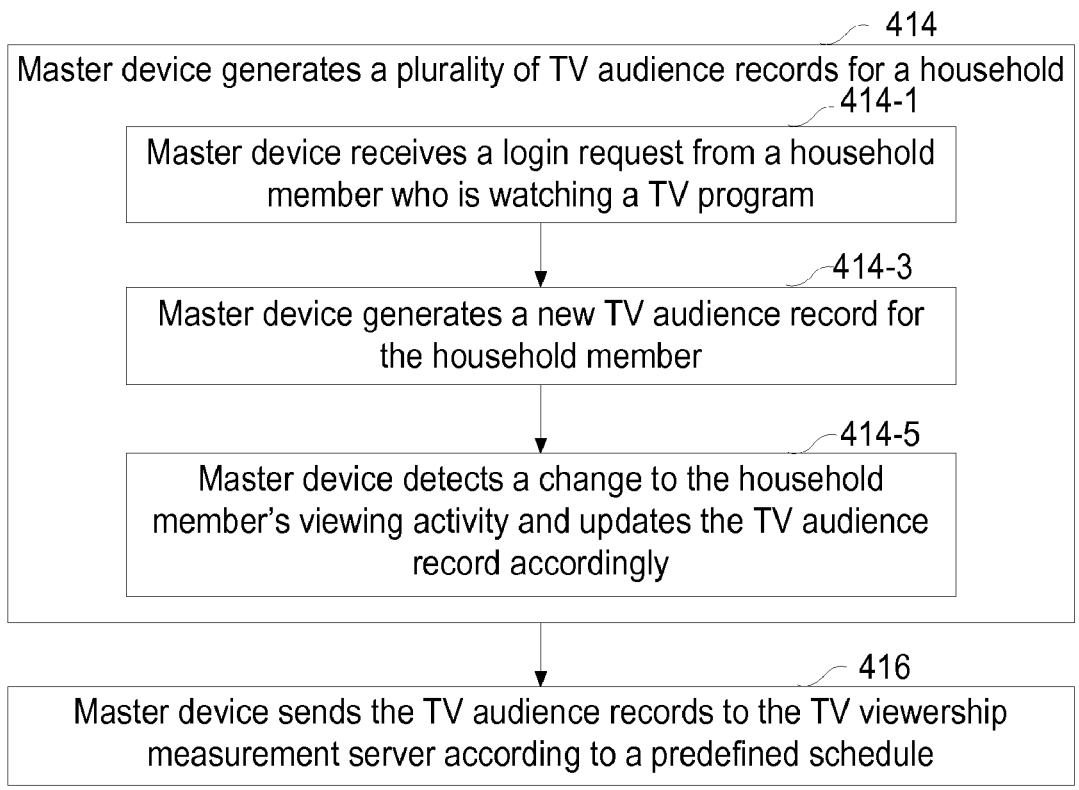

FIGS. 4A and 4B are flow charts illustrating how the TV audience survey system 103 generates TV broadcast records and TV audience records for a household, respectively, in accordance with some implementations.

As shown in FIG. 4A, the master device 105 generates (410) a plurality of TV broadcast records for the household in accordance with a first predefined schedule. In some implementations, the master device 105 is set to be always on. For example, the master device 105 is configured to check whether the TV 116 is broadcasting any program every 8-15 seconds. If no audio signal is detected, the TV 116 is presumed to be off and the master device 105 does nothing but wait for the next scheduled checkup time. If the master device 105 detects an audio signal broadcast from the TV 116, the master device 105 generates (410-1) an audio fingerprint using the detected audio signal. Next, the master device 105 generates (410-3) a TV broadcast record 226, which includes a record ID, the audio fingerprint, and a recording timestamp. In some implementations, the record ID is the IP address 126 of the household 180 or the like that can uniquely identify the household.

Following a second predefined schedule, the master device 105 sends (412) a plurality of TV broadcast records to the TV viewership measurement server 150. In some implementations, the master device 105 is scheduled to send the TV broadcast records it has generated during the past 24 hours to the TV viewership measurement server 150 at a predefined time everyday (e.g., mid-night) when there are very few household members watching the TV and there are relatively more network resources available for this data transfer. As will be explained below, the TV viewership measurement server 150 aggregates these TV broadcast records to determine the TV programs that have been broadcast at the household 180 as well as the starting time and the ending time of each program.

As shown in FIG. 4B, besides the TV broadcast records, the master device 105 also generates (414) a plurality of TV audience records for a household. When a household member (also referred to as a panelist) decides to watch the TV, he or she is required to first log into the TV audience survey system 103. As noted above in connection with FIGS. 1A and 1B, there are two ways to log into the system by either pressing the activation button on the tag carried by the household member or entering the household member's tag ID through the user interface of the master device 105. For example, the master device 105 may have a touchscreen displaying the names of the household members and any household member can log into the system through a finger touch on any of the names. In some implementations, every household member has a dedicated tag so that the master device 105 can tell who is currently watching the TV by interacting with different tags. In either case, the master device 105 receives (414-1) a login request from the household member. In response, the master device 105 generates (414-3) a new TV audience record for the household member. It should be noted that, since a household member needs to take an active step by, e.g., logging into his or her account through the master device 105, the new TV audience record is generated with the implicit approval of the household member. In some implementations, when the user logs into to her or her account, that user can be reminded that their online and media viewing activities associated with that account are being shared in accordance with an applicable member agreement. In some other implementations, the household member may expressly consent to be "tagged" when he or she signs an agreement with an entity that is responsible for managing the TV viewership measurement server 150 or its authorized representative.

Next, the master device 105 starts surveying the household member's TV viewing activities. In some implementations, the tag carried by the household member sends a heartbeat signal to the master device 105 at a predefined time interval (e.g., 2-4 minutes). The heartbeat signal received by the master device 105 indicates that the household member is still watching the TV after submitting its login request. In some implementations, the tag sends a heartbeat signal in response to a query signal from the master device 105. At some time later, the master device 105 detects (414-5) a change to the household member's viewing activity and then updates the TV audience record accordingly. For example, the household member may send a logout request to the master device 105, indicating that it no longer watches the TV. In this case, the master device 105 updates the TV audience record to reflect the household member's decision in its viewership status of the TV audience record. Note that this scenario is the ideal case in which the household member does stop watching the TV by, e.g., walking away from the TV and the TV viewership data reported by the set top box 117 does not include any "false positive" or "false negative" scenarios.

Figure 4C:
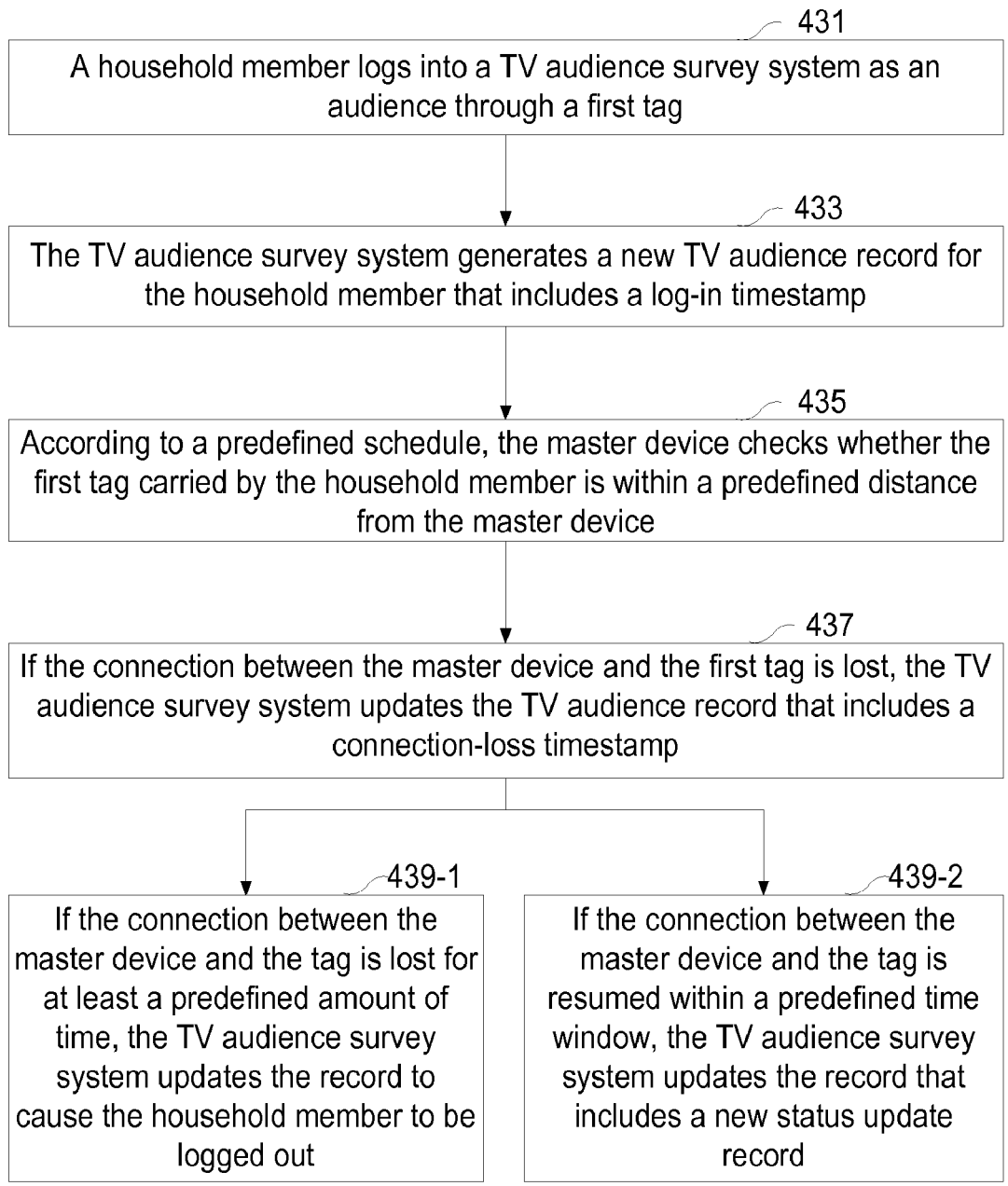
FIG. 4C is a flow chart illustrating how the TV audience survey system determines and processes a false positive scenario for a household member in accordance with some implementations.
Figure 4D:
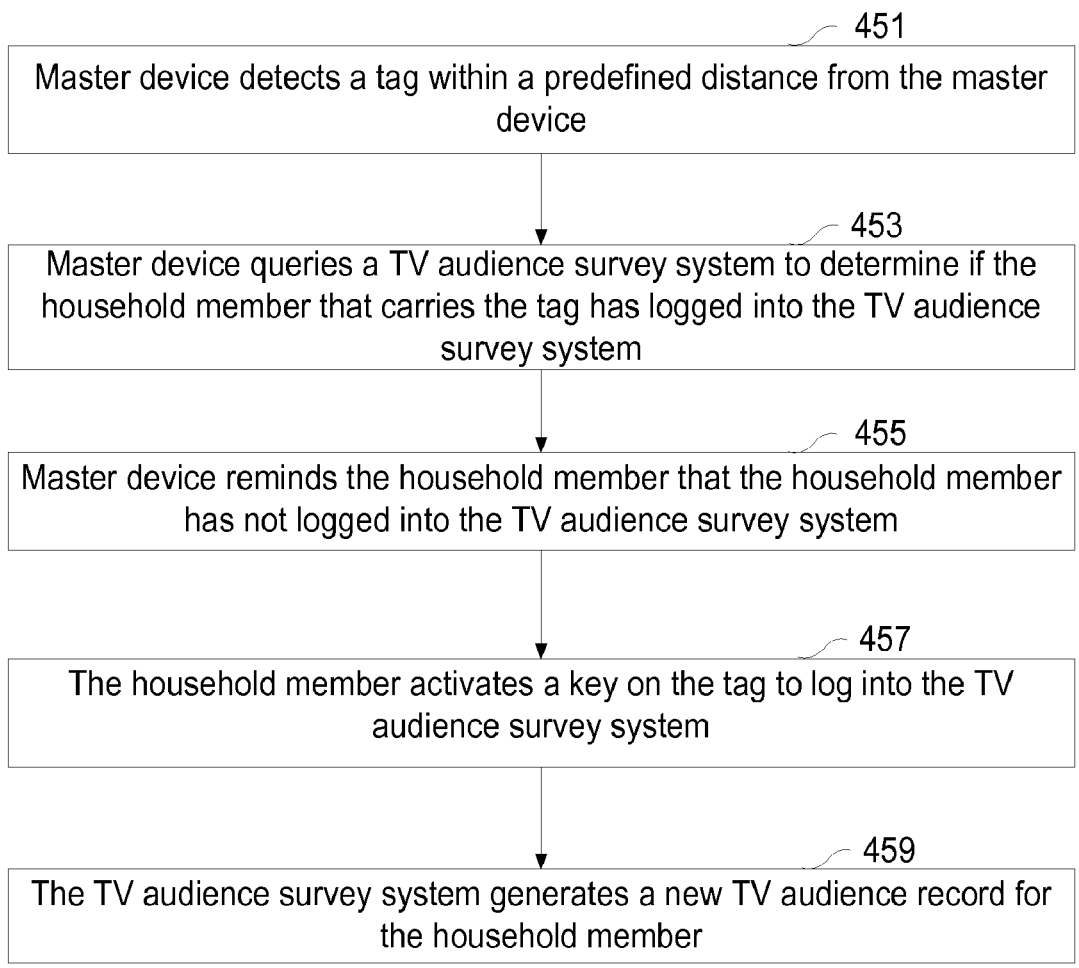
FIG. 4D is a flow chart illustrating how the TV audience survey system determines and processes a false negative scenario for a household member in accordance with some implementations.

In the real world, a household member may send the logout request without quitting watching the TV, which corresponds to a "false negative" scenario. In addition, a household member may walk away from the TV to take care of something else without logging out of the TV audience survey system, which corresponds to a "false positive" scenario. The household member may then come back to watch the TV after completing something else. FIGS. 4C and 4D are flow charts illustrating how to deal with these "false positive" or "false negative" scenarios that are common in the real life.

FIG. 4C is a flow chart illustrating how the TV audience survey system 103 determines and processes a false positive scenario for a household member in accordance with some implementations. Assuming that the household member carries a first tag, he or she logs (431) into the TV audience survey system as a registered audience by pressing a button on the first tag. In response, the TV audience survey system generates (433) a new TV audience record for the household member that includes a log-in timestamp. An exemplary TV audience record 234 is described above in connection with FIG. 2.

The master device 105 then starts (435) checking whether the first tag carried by the household member is within a predefined distance from the master device 105 in accordance with a predefined schedule (e.g., every 2-4 minutes). As described above in connection with FIG. 1B, the master device 105 may set the initial status of the household member to be "logged-in" after receiving a login signal generated by the press of the button on the first tag. Next, the first tag broadcasts a heartbeat signal at a regular time interval. Upon detection of the heartbeat signal, the master device 105 updates the status of the household member to be "active," indicating that the household member is actively engaged in watching the TV. In some implementations, the master device 105 may bypass the "logged-in" status and set the household member's status to be "active" upon receiving the login signal. In some implementations, the master device 105 updates the TV audience record (e.g., the last heartbeat timestamp 250) associated with the household member whenever it receives a new heartbeat signal to reflect the most recent TV viewing activity by the household member.

For illustrative purpose, it is assumed that the connection between the master device 105 and the first tag is lost at a later time. For example, when the household member goes to another room to answer a phone call and the master device 105 cannot detect a heartbeat signal from the first tag for an extended period of time (e.g., 20 minutes) and it may assume that its connection with the first tag is lost. In this case, the TV audience survey system updates (437) the TV audience record (e.g., inserting a status update entry 242) to reflect when there was a change to the audience status (e.g., from "active" to "inactive"). In some implementations, the "inactive" status is treated differently from the "logged-out" status, which indicates that the household member has quitting watching the TV by expressly logging out of the TV audience survey system by pressing the button on the first tag again. The "inactive" status indicates that the household member is temporarily away from watching the TV and he or she may or may not come back sometime in the future.

If the household member does not come back to watch the TV within a predefined amount of time (e.g., 30 minutes), the TV audience survey system updates (439-1) the TV audience record to cause the household member to be logged out. In some implementations, the TV audience survey system also inserts another status update entry 242 into the TV audience record to reflect that the household member is forced to be logged out during this round of TV viewing activities. If, however, the household member returns to watch the TV within the predefined amount of time (e.g., the master device 105 receives a new heartbeat signal from the first tag), the TV audience survey system updates (439-2) the TV audience record by, e.g., inserting another status update entry 242 into the TV audience record, to reflect the change to the status of the household member from "inactive" to "active." In this example, the time gap between two consecutive status update entries that are captured by the TV audience record can be used by, e.g., the TV viewership measurement server 150, to detect "false positive" scenario in the of the household member's TV viewing activities. In some implementations, the master device 105 may also send an alert or warning message to the household member (e.g., in the form of an email or text message) if he or she repeatedly forgets to log out of the TV audience survey system when quitting watching the TV.

FIG. 4D is a flow chart illustrating how the TV audience survey system 103 determines and processes a false negative scenario for a household member in accordance with some implementations. In some implementations, the master device 105 detects (451) a tag within a predefined distance from the master device 105 by, e.g., receiving a heartbeat signal from the tag. In some implementations, the master device 105 can detect the heartbeat signal from any tag within a predefined distance from the master device 105 regardless of whether the household member that carries the tag has logged into the TV audience survey system. For example, the heartbeat signal may be picked up by the master device 105 while the household member has logged into the TV audience survey system and is actively watching the TV. Alternatively, the heartbeat signal may be detected when the household member has not logged into the TV audience survey system (e.g., the household member may be logged out by the TV audience survey system for not receiving a heartbeat signal from the corresponding tag).

Before determining which of the two cases above is true, the master device 105 queries (453) the TV audience survey system for a TV audience record to determine if the household member that carries the tag has logged into the TV audience survey system. If there is a TV audience record associated with the household member whose current audience status is "active," the household member will be treated in a manner like what is described above in connection with operation 435 of FIG. 4C. If no TV audience record is identified as being associated with the household member or the identified TV audience record indicates that the household member's current audience status is "logged-out," the household member will be treated in the manner as described below in connection with FIG. 4D.

If the master device 105 determines that the household member with whom the tag is associated has not logged into the TV audience survey system but is currently watching the TV, it may remind (455) the household member so by, e.g., sending an alert signal to the household member. In some implementations, the alert signal is a blinking signal generated by the master device 105 through its display. In some other implementations, the alert signal is a beeping sound signal or a vibration signal generated by the tag carried by the household member. One skilled in the art would appreciate that the master device 105 may generate other types of alert signals in order to bring to the household member's attention that he or she has been watching the TV without logging into the TV audience survey system appropriately and such act would cause false negative scenarios in the TV viewership data collected from this household. In response to the alert signal, the household member then activates (457) a key on the tag, which triggers the TV audience survey system (459) to generate a new TV audience record for the household member.

In some cases, if a household member repeatedly violates the TV audience survey protocol defined by the TV audience survey system, the TV audience survey system may report such household member to the TV viewership measurement server 150, which may send warning letters or messages to the household or even revoke the household's participation of the TV audience survey. In some implementations, the TV audience survey system 103 not only alerts members of a household not to violate the protocol but also reports to the TV viewership measurement server 150 the false negative scenarios happening within the household.

Referring again to FIG. 4D, the TV audience survey system generates a false scenario record for each detected tag after the query at operation 453 fails to return a TV audience record that corresponds to a household member that is actively watching the TV. This false scenario record includes a tag ID that uniquely identifies a tag that has been assigned to a particular household member and a period of time indicating how long the household member has been watching the TV without logging into the TV audience survey system. When the false scenario record is reported to the TV viewership measurement server 150, the TV viewership measurement server 150 can use the record to update the TV viewership data reported by the set top box from the same household to eliminate the "false negative" scenarios from the data.

As noted above in connection with FIGS. 4A and 4B, the master device 105 sends the TV broadcast records and the TV audience records to the TV viewership measurement server 150 according to predefined schedules, respectively. As described below, the TV viewership measurement server 150 performs at least two functions: correlating the TV broadcast records and the TV audience records to determine which household members actually watched what TV programs (FIG. 5A) and updating the TV viewership metering data reported by the set top box 117 (FIG. 5B).

Figure 5A:
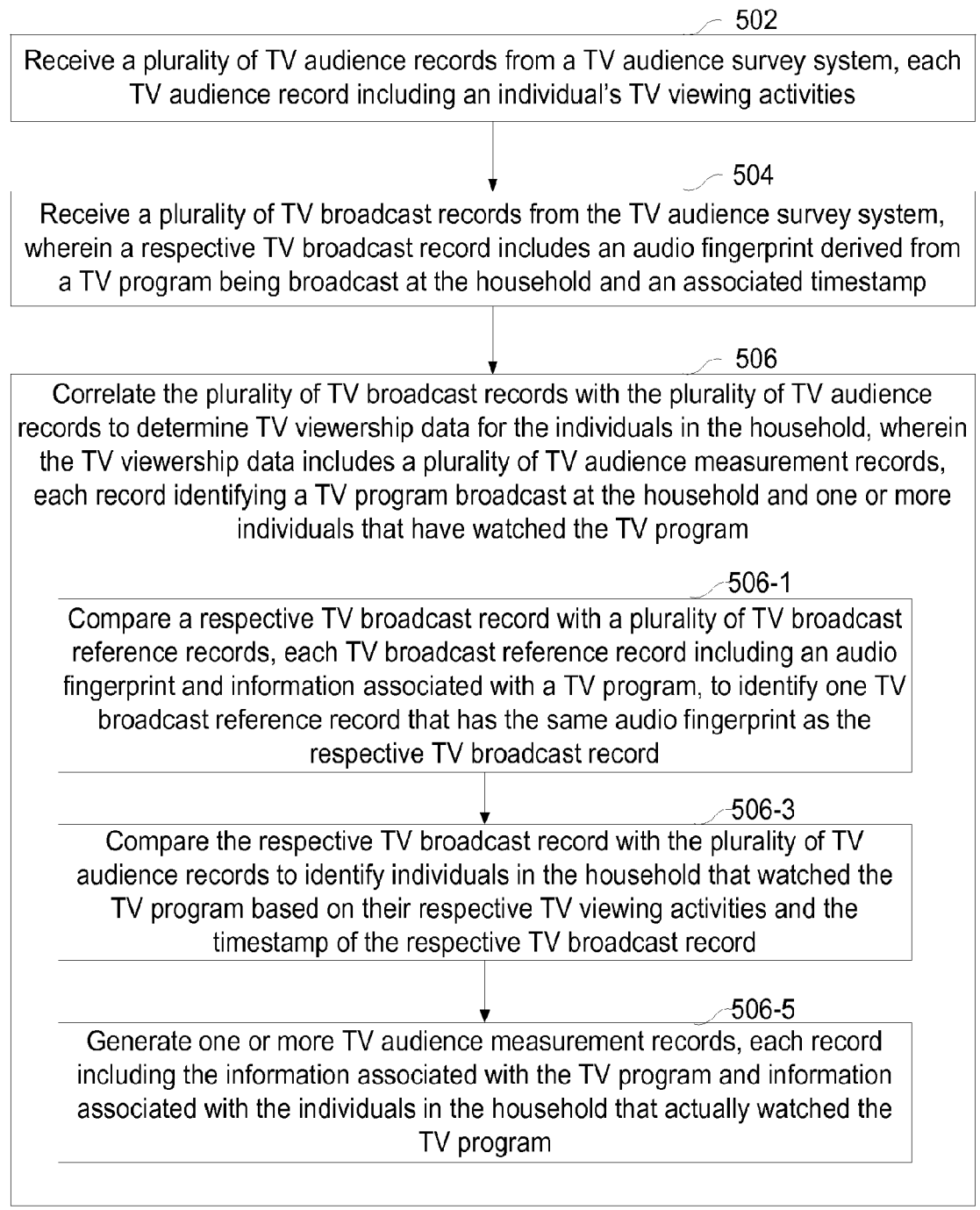
FIG. 5A is a flow chart illustrating how the TV viewership measurement server generates TV audience measurement records for a household in accordance with some implementations.
Figure 5B:
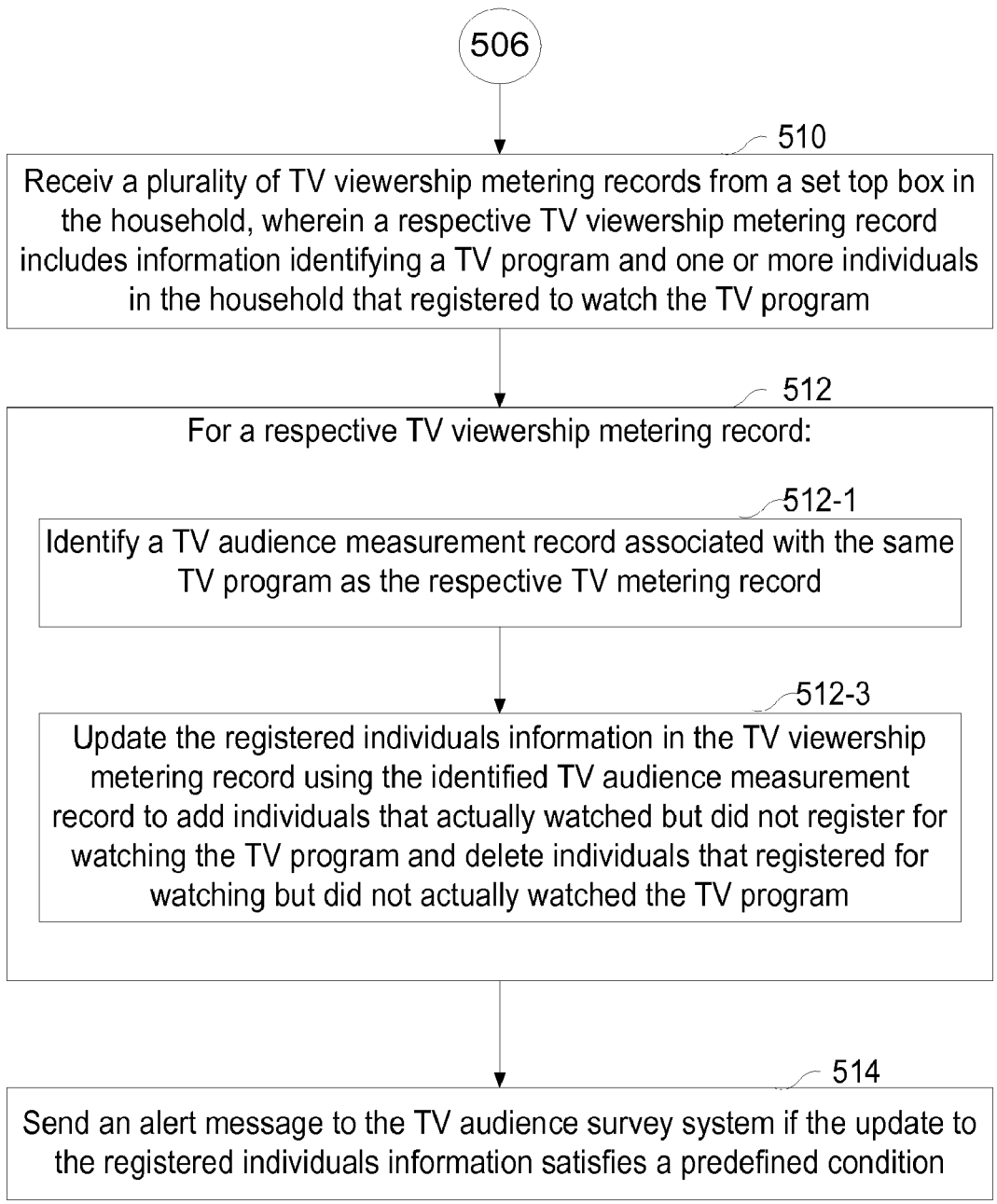
FIG. 5B is a flow chart illustrating how the TV viewership measurement server updates TV viewership metering records for a household in accordance with some implementations.

FIG. 5A is a flow chart illustrating how the TV viewership measurement server 150 generates TV audience measurement records for a household in accordance with some implementations. According to predefined schedules, the TV viewership measurement server 150 receives (502) a plurality of TV audience records from the TV audience survey system and receives (504) a plurality of TV broadcast records from the TV audience survey system. As described above in connection with FIG. 2, a TV audience record includes an individual's TV viewing activities and a respective TV broadcast record includes an audio fingerprint derived from a TV program being broadcast at the household and an associated timestamp. The TV viewership measurement server 150 correlates (506) the plurality of TV broadcast records with the plurality of TV audience records to determine TV viewership data for the individuals in the household. For example, the TV viewership data includes a plurality of TV audience measurement records, each record identifying a TV program broadcast at the household and one or more individuals that have watched the TV program.

In some implementations, the TV viewership measurement server 150 compares (506-1) a respective TV broadcast record with a plurality of TV broadcast reference records to identify one TV broadcast reference record that has the same audio fingerprint as the respective TV broadcast record. Note that a TV broadcast reference record is provided to TV viewership measurement server 150 by a third-party (e.g., a TV broadcaster), which includes an audio fingerprint and information associated with a TV program. The TV viewership measurement server 150 then compares (506-3) the respective TV broadcast record with the plurality of TV audience records to identify individuals in the household that watched the TV program based on their respective TV viewing activities and the timestamp of the respective TV broadcast record. Finally, the TV viewership measurement server 150 generates (506-5) one or more TV audience measurement records, each record including the information associated with the TV program and information associated with the individuals in the household that actually watched the TV program.

As noted above, one goal of the TV audience survey system 103 is to identify those "false positive" or "false negative" scenarios present in the TV viewership metering data provided by the set top box 117 in a household. FIG. 5B is a flow chart illustrating how the TV viewership measurement server 150 updates TV viewership metering records for the household in accordance with some implementations. The TV viewership measurement server 150 receives (510) a plurality of TV viewership metering records from a set top box in the household. In some implementations, a respective TV viewership metering record includes information identifying a TV program and one or more individuals in the household that registered to watch the TV program.

For a respective TV viewership metering record (512), the TV viewership measurement server 150 identifies (512-1) a TV audience measurement record associated with the same TV program as the respective TV metering record and updates (512-3) the registered individuals information in the TV viewership metering record using the identified TV audience measurement record to add individuals that actually watched but did not register for watching the TV program (e.g., a "false negative" scenario) and delete individuals that registered for watching but did not actually watched the TV program (e.g., a "false positive" scenario). Finally, the TV viewership measurement server 150 may send (514) an alert message to the TV audience survey system 103 if the update to the registered individuals information satisfies a predefined condition (e.g., one or more household members often move away from the TV without logging out or watch the TV without logging in appropriately). The TV audience survey system 103 may then notify the corresponding household members that they are running the risk of being dismissed from the TV viewership metering data program conducted by a third-party agency, which may provide financial incentives to the household members for signing up the program.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Finally, the foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method for determining TV viewership data of individuals in a household equipped with a TV audience survey system, comprising:

at a computer server having memory and one or more processors:

receiving a plurality of TV audience records from the TV audience survey system, the TV audience survey system comprising a master device and one or more tags each associated with a respective individual, wherein a respective TV audience record includes an individual's TV viewing activities including generated status update entries based on locations of the one or more tags relative to the master device, the locations determined by signals sent by the one or more tags to the master device;

receiving a plurality of TV broadcast records from the TV audience survey system, wherein a respective TV broadcast record includes an audio fingerprint derived from a TV program being broadcast at the household and an associated timestamp;

receiving a plurality of TV viewership metering records from the TV audience survey system, wherein a respective TV viewership metering record includes information identifying a TV program and one or more individuals in the household that registered to watch the TV program;

for a respective TV viewership metering record, identifying a TV audience record associated with the same TV program as the respective TV viewership metering record;

correlating the plurality of TV broadcast records with the plurality of TV audience records to generate TV viewership data for the individuals in the household based on timestamps and broadcast strength of the tags, wherein the TV viewership data includes a plurality of records, each record identifying a TV program broadcast at the household and one or more individuals that have watched the TV program by comparing the respective TV broadcast record with a plurality of TV broadcast reference records to identify one TV broadcast reference record that has the same audio fingerprint as the respective TV broadcast record;

updating the registered individual's information in the TV viewership metering record using the identified TV audience measurement record to add individuals that actually watched but did not register for watching the TV program and delete individuals that registered for watching but did not actually watch the TV program; and sending an alert message to the TV audience survey system if the update to the registered individuals information satisfies a predefined condition.

2. The computer-implemented method of claim 1, wherein the TV audience survey system is configured to send the plurality of TV viewership metering records to the computer server via a wired communication network.

3. The computer-implemented method of claim 1, wherein the respective TV audience record includes a plurality of audience status update entries that keep track of the location of a tag carried by an individual relative to the master device.

4. The computer-implemented method of claim 1, wherein the TV audience survey system is configured to send the plurality of TV audience records and the plurality of TV broadcast records to the computer server via a wireless communication network.

5. A computer system for determining TV viewership data of individuals in a household equipped with a TV audience survey system, comprising:

one or more processors; and memory storing one or more programs to be executed by the one or more processors, the one or more programs comprising instructions for:

receiving a plurality of TV audience records from the TV audience survey system, the TV audience survey system comprising a master device and one or more tags each associated with a respective individual, wherein a respective TV audience record includes an individual's TV viewing activities including generated status update entries based on locations of the one or more tags relative to the master device, the locations determined by signals sent by the one or more tags to the master device;

receiving a plurality of TV broadcast records from the TV audience survey system, wherein a respective TV broadcast record includes an audio fingerprint derived from a TV program being broadcast at the household and an associated timestamp;

receiving a plurality of TV viewership metering records from the TV audience survey system, wherein a respective TV viewership metering record includes information identifying a TV program and one or more individuals in the household that registered to watch the TV program;

for a respective TV viewership metering record, identifying a TV audience record associated with the same TV program as the respective TV viewership metering record;

correlating the plurality of TV broadcast records with the plurality of TV audience records to generate TV viewership data for the individuals in the household based on timestamps and broadcast strength of the tags, wherein the TV viewership data includes a plurality of records, each record identifying a TV program broadcast at the household and one or more individuals that have watched the TV program by comparing the respective TV broadcast record with a plurality of TV broadcast reference records to identify one TV broadcast reference record that has the same audio fingerprint as the respective TV broadcast record;

updating the registered individual's information in the TV viewership metering record using the identified TV audience measurement record to add individuals that actually watched but did not register for watching the TV program and delete individuals that registered for watching but did not actually watch the TV program; and sending an alert message to the TV audience survey system if the update to the registered individuals information satisfies a predefined condition.

6. The computer system of claim 5, wherein the TV audience survey system is configured to send the plurality of TV viewership metering records to the computer server via a wired communication network.

7. The computer system of claim 5, wherein the respective TV audience record includes a plurality of audience status update entries that keep track of the location of a tag carried by an individual relative to the master device.

8. The computer system of claim 5, wherein the TV audience survey system is configured to send the plurality of TV audience records and the plurality of TV broadcast records to the computer server via a wireless communication network.

9. A non-transitory computer readable medium storing one or more programs to be executed by a one or more processors, the one or more programs comprising instructions for:

receiving a plurality of TV audience records from the TV audience survey system, the TV audience survey system comprising a master device and one or more tags each associated with a respective individual, wherein a respective TV audience record includes an individual's TV viewing activities including generated status update entries based on locations of the one or more tags relative to the master device, the locations determined by signals sent by the one or more tags to the master device;

receiving a plurality of TV broadcast records from the TV audience survey system, wherein a respective TV broadcast record includes an audio fingerprint derived from a TV program being broadcast at the household and an associated timestamp;

receiving a plurality of TV viewership metering records from the TV audience survey system, wherein a respective TV viewership metering record includes information identifying a TV program and one or more individuals in the household that registered to watch the TV program;

for a respective TV viewership metering record, identifying a TV audience record associated with the same TV program as the respective TV viewership metering record;

correlating the plurality of TV broadcast records with the plurality of TV audience records to generate TV viewership data for the individuals in the household based on timestamps and broadcast strength of the tags, wherein the TV viewership data includes a plurality of records, each record identifying a TV program broadcast at the household and one or more individuals that have watched the TV program by comparing the respective TV broadcast record with a plurality of TV broadcast reference records to identify one TV broadcast reference record that has the same audio fingerprint as the respective TV broadcast record;

updating the registered individual's information in the TV viewership metering record using the identified TV audience measurement record to add individuals that actually watched but did not register for watching the TV program and delete individuals that registered for watching but did not actually watch the TV program; and sending an alert message to the TV audience survey system if the update to the registered individuals information satisfies a predefined condition.

10. The non-transitory computer readable medium of claim 9, wherein the TV audience survey system is configured to send the plurality of TV viewership metering records to the computer server via a wired communication network.

11. The non-transitory computer readable medium of claim 9, wherein the respective TV audience record includes a plurality of audience status update entries that keep track of the location of a tag carried by an individual relative to the master device.

12. The non-transitory computer readable medium of claim 9, wherein the TV audience survey system is configured to send the plurality of TV audience records and the plurality of TV broadcast records to the computer server via a wireless communication network.

* * * * *